United States Patent [19]

Bartels

[11] 4,356,406
[45] Oct. 26, 1982

[54] CONDUCTIVE FLUID PROBE POWERING MEANS

[75] Inventor: James I. Bartels, Hudson, Wis.

[73] Assignee: Honeywell Inc., Minneapolis, Minn.

[21] Appl. No.: 235,254

[22] Filed: Feb. 17, 1981

[51] Int. Cl.³ .................... G01F 23/00; G08B 21/00
[52] U.S. Cl. ................................ 307/118; 340/620
[58] Field of Search .................. 307/118; 73/304; 340/620

[56] References Cited

U.S. PATENT DOCUMENTS

| | | | |
|---|---|---|---|
| 3,644,885 | 2/1972 | Radin | 340/620 X |
| 4,027,172 | 5/1977 | Hamelink | 307/118 |
| 4,107,658 | 8/1978 | Hill et al. | 340/620 |
| 4,224,606 | 9/1980 | Bartels | 340/620 X |

Primary Examiner—Donald A. Griffin
Attorney, Agent, or Firm—Alfred N. Feldman

[57] ABSTRACT

A conductive fluid probe, one particularly used in sensing a boiler water, is operated with pulsed energy from the charging and discharging of a capacitor. The charging is allowed to occur in a normal resistance-capacitor manner, while the discharge is rapidly accomplished. The energy of both halves of the charge and discharge cycle are substantially the same even though the magnitudes of peak voltages are substantially different thereby operating the probe with a minimum of electrolysis and a maximum cleaning action.

8 Claims, 2 Drawing Figures

CONDUCTIVE FLUID PROBE POWERING MEANS

BACKGROUND OF THE INVENTION

Resistive fluid detecting means or probes to sense the presence or absence of boiler water in heating plants have been known for many years. This type of probe normally relies on the establishment of a conductive circuit or circuits between a probe and the boiler. A resistance measurement is then converted into a decision as to whether or not boiler water is present. Various types of probe structures have been developed, but in the last few years a substantially fail safe type of probe has been developed. This probe is disclosed in detail in the Hamelink U.S. Pat. No. 4,027,172 which issued on May 31, 1977. The Hamelink probe utilizes a guard ring member that is intermediate the main probe element and the common element or ground for the system. By the utilization of this type of probe structure, inadvertent shorting of the probe typically causes the system to close down in a safe manner.

Unfortunately, the use of probes that are energized by a potential and immersed in a conductive fluid create a problem of transfer of material within the fluid due to electrolysis. Probe structures also suffer from the problem of the probe elements becoming coated with materials that are in suspension in the conductive fluid and/or dissolution of probe elements into the fluid. In the case of a probe used for detection of water in a boiler, the minerals in the water tend to deposit out on the probe elements. The application of a direct current potential to a probe element causes plating and erosion problems. The application of alternating current to a probe element also can cause plating problems and allows for the deposit of dissolved minerals on the probe structure. In order to reduce these problems to a minimum, it has become common to energize the probes generally with alternating current as is disclosed in the Hamelink patent.

SUMMARY OF THE INVENTION

It has been found that by applying a voltage to the probe that alternates in polarity that certain benefits can be derived. By energizing a probe with an alternating current potential having a particular characteristic or wave form, the problems of plating and deposit of materials can be minimized. Erosion is also minimized by limiting the energy applied to the probe.

In the present invention a probe structure, such as that disclosed in the Hamelink patent, is energized from a source of alternating current potential. The potential is applied to a capacitor which has a normal resistance-capacitance charge curve. When the potential stored on the capacitor reaches a predetermined level, a gating circuit is energized which allows for rapid discharge of the capacitor through the probe element and the conductive fluid or water that it is sensing. This rapid discharge of the capacitor provides a number of benefits. In the first place, the rapid change in potential has the ability to keep certain of the probe elements free of deposits. The magnitude of the discharged peak allows for proper sensing of the presence of water around the probe. If the total energy supplied to the probe through the water is kept equal on both the charge cycle of the capacitor through the water and on the discharge cycle through the water, the problems of depositing of material through electrolysis is minimized.

With the present invention a special power supply is provided that allows for charging and discharging of a capacitor in the described manner. The capacitor is slowly charged to a relatively low potential, and then is rapidly discharged to a peak potential that can be readily sensed. On the reverse half cycle of the applied alternating current to the power supply, the energy is dissipated through a diode and a resistor and allows the commutation of the solid state switch that was used to discharge the capacitor.

DESCRIPTION OF THE PREFERRED EMBODIMENT

Figure 1:
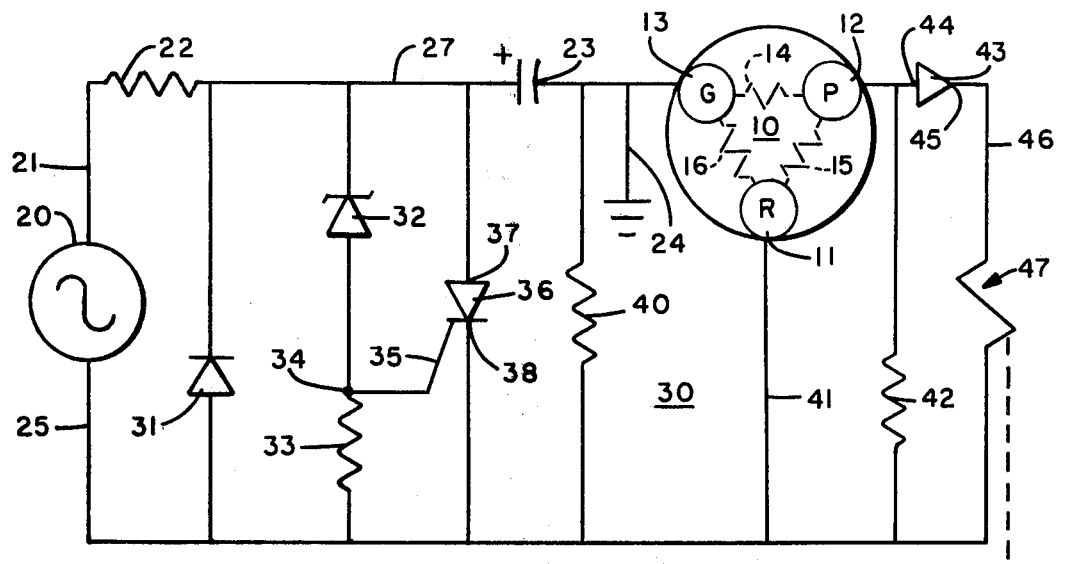
FIG. 1 is a schematic representation of a circuit applied to a three element probe.

In the disclosure of FIG. 1, a conductive fluid probe 10 is disclosed of the type previously mentioned as covered by the Hamelink patent. The probe 10 is designed to be inserted in a container, such as a boiler, to detect the presence of a conductive fluid, such as boiler water. The probe 10 has a guard ring 11 that is intermediate a probe element 12 and a common or ground 13. Three possible paths are established between the conductive fluid probe elements within the water and are disclosed as phantom resistors 14, 15, and 16. The resistance 14 would be the normal resistive path through the conductive fluid or water between the probe 12 and the ground or common element 13. The resistance path 15 would be a path between the probe 12 and the guard ring 11. The last path would be the resistive path that could be created between the guard ring 11 and the ground if the container was full or if a buildup of residue occurred on the probe. The function of the probe 10 is to complete a conductive path between the probe 12 and the common or ground 13 in order to sense the presence or absence of a fluid such as water in a boiler. As was disclosed in the Hamelink patent this type of probe element typically has been energized with a conventional source of alternating current voltage. As was pointed out in the Background of the Invention and the Summary of the Invention the application of this type of voltage creates problems of transfer of material between the various elements of the system and with the buildup of residue on the probe itself. By energizing the probe 10 in the manner that will be described in connection with the balance of the application, these problems can be minimized.

In FIG. 1 a conventional source of alternating current potential is disclosed at 20 connected by conductor 21 through a resistor 22 to a capacitor means 23 that is connected by a conductor 24 to ground and to the common or ground probe element 13. The alternating current potential 20 is connected further by conductor 25 to a conductor 26 that forms a common for the circuit disclosed in FIG. 1. The conductors 21 and 26 connect the source 20 generally to an impedance means 30 that is made up of the various elements that supply power to the probe 10 and include the probe 10 when the probe is in contact with a conductive fluid. Connected between the resistor 22 and the conductor 26 is a diode means 31 that is capable of conducting substantially all of the current available from the source 20 when the conductor 26 is positive with respect to conductor 21. The amount of current conducted is limited solely by the circuit impedance including the resistor 22.

The diode 31 is paralleled by a zener diode 32 connected in series with a resistor 33 having a common point 34. The zener diode 32 and the resistor 33 make up a voltage divider that is connected to a gate 35 of a silicon controlled rectifier 36 that has its anode connection 37 and its cathode connection 38 connected in parallel with the diode 31, but with the diode 31 poled oppositely to that of the silicon controlled rectifier 36. The anode 37 of the silicon controlled rectifier 37 is connected to a common conductor 27 that connects the resistor 22 to the capacitor means 23. The cathode 38 of the silicon controlled rectifier 36 is connected to the conductor 26.

The input to the probe means 10 further includes a resistor 40 between the conductor 26 and the ground 24 where it is common to the capacitor means 23 and the common element 13 of the probe means 10. A conductor 41 connects the guard ring 11 of the probe means 10 to the conductor 26, and a resistor 42 connects the conductor 26 to the probe element 12. The elements described to this point form a capacitor means and impedance means that is connected to the voltage source so that the capacitor means can be charged and discharged through the impedance means.

The circuit of FIG. 1 is completed by an amplifier means 43 that has an input means 44 that is connected to the resistor 42 and the probe 12. The output of the amplifier means 43 is disclosed at 45 and is connected by a conductor 46 to a relay means 47 that includes a contact element 48 that is moved between a normally open contact 50 and a normally closed contact 51. The moveable element 48 and the contacts 50 and 51 are connected by appropriate circuitry to a load means 52 which would be a boiler control means capable of proper operation of a water filled boiler. The details of the load means 52 are not material to the present invention and have been shown schematically as a load controlled by the amplifier 43 and its associated relay 47.

Figure 2:
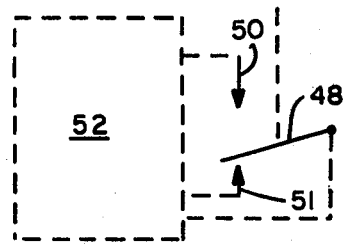
FIG. 2 is the voltage wave form at the probe element when a fluid is detected.
Figure 2:
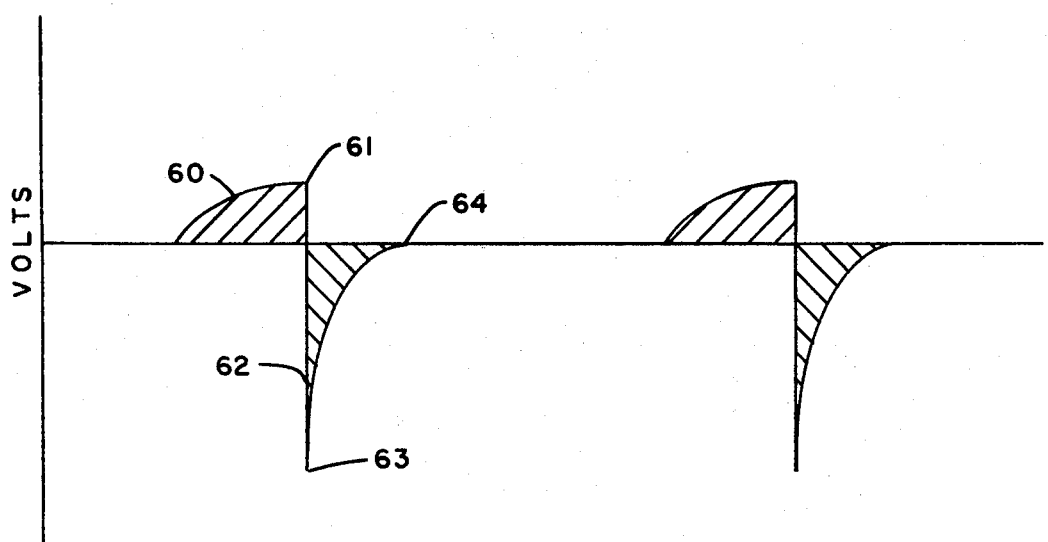

In operation, the circuit of FIG. 1 provides for the energization of the relay 47 by the amplifier means 43 when the conductive fluid, such as water, is sensed by the probe means 10. It will therefore be assumed that the path 14 between the probe 12 and the ground 13 exist, and that the paths 15 and 16 may or may not exist. This is not material to the description of operation of the power supply and control means disclosed. With the source of alternating current 20 applied to the circuit of FIG. 1, when the conductor 21 is positive with respect to conductor 25, a current flows in the conductor 27 to charge the capacitor 23. The return path from the capacitor 23 to the source 20 is through the resistor 40, the various resistance circuits of the probe 10, and the resistor 42. As the potential on the conductor 27 builds, a voltage charge is accumulated on the capacitor in a normal resistance-capacitance type of curve. This is shown in FIG. 2 at 60 on the curve of FIG. 2 which is a representation of the voltage applied to the probe means 10.

As the voltage on conductor 27 reaches a predetermined voltage level, the zener diode 32 breaks down and begins to conduct through the resistor 33 thereby generating a positive potential at point 34 which is connected to the gate 35 of the silicon controlled rectifier 36. This causes the silicon controlled rectifier 36 to be gated into conduction. In FIG. 2 this point is disclosed at 61. The conduction of the silicon controlled rectifier 36 immediately starts to discharge the capacitor 23 through the resistor 40, the resistances 14, 15, and 16 of the probe 10, and through the resistor 42 in the input 44 of the amplifier means 43. This is disclosed at the sharply changing wave form 62 of FIG. 2, and it reaches a peak at 63 which is substantially higher than the peak 61 reached on the initial portion of the charge of the capacitor 23. The capacitor 23 sharply discharges to the level 64 as the source 20 returns to a neutral voltage between the conductors 21 and 25. It will be noted in FIG. 2 that the peak 61 reached in the voltage on the probe 10 is substantially lower than the peak 63, but it should be noted that the total energy of the two portions of the charge and discharge cycle (shown shaded) are substantially the same. When the voltage of source 20 reverses so that the source 20 applies a positive potential to conductor 25 with respect to conductor 21, this voltage is shunted through the diode 31 and the resistor 22 back to the source 20 without applying any significant voltage to the capacitor 23, the impedance means 30, or the probe 10. When the voltage source 20 reverses once again the wave form previously described in connection with FIG. 2 repeats itself. As such, a series of pulses of energy are applied to the input means 44 of the amplifier means 43 thereby energizing the relay 47 to move the moveable contact 48 into engagement with the contact 50 to properly energize the load means 52. As long as the conductive fluid exists in the presence of the probe 10, the pulsed voltage having dissimilar voltage peaks 61 and 63 is applied and the relay 47 is energized. The characteristic of the voltage applied to the probe 10 as disclosed in FIG. 2 is significantly different than an ordinary alternating current in that a very low level of voltage can be applied (as exemplified by the low level of voltage at 61) but a substantially larger voltage at 63 is also generated for a very short period of time to ensure that the amplifier means 43 can function to energize the relay means 47. As long as the energy supplied on both portions of the wave disclosed in FIG. 2 are alike, little or no electrolysis occurs. The sharp wave form at 63 tends to keep the probe elements clean of impurities that exist in the water and provide for a probe operation which is not available by energizing the probe with a conventional alternating current voltage.

The concept of the present invention is the idea of applying a low level of voltage to the probe while charging a capacitor, and then rapidly discharging the capacitor to provide a sensing signal to the probe that has an equal and balancing energy content but that is short in duration and sharp in nature. The exact circuitry for accomplishing this type of energization of the probe means 10 could be varied extensively and the circuit disclosed in FIG. 1 is merely an example of one implementation of the present invention. Since the present invention could be modified extensively by one skilled in the art, the applicant wishes to be limited in the scope of his invention solely by the scope of the appended claims.

The embodiments of the invention in which an exclusive property or right is claimed are defined as follows:

1. A power supply and control for a conductive fluid probe which is adapted to be connected to a source of voltage having alternating voltage phases, and wherein said probe has a guard ring intermediate a probe element and a common element with said probe adapted to be immersed in a conductive fluid, including: capacitor means and impedance means connected to said voltage source with said capacitor means being charged and discharged through said impedance means; said conductive fluid probe forming part of said impedance means when said probe is immersed in said conductive fluid; said impedance means further including unidirectional switch means connected to rapidly discharge said capacitor means through said impedance means including said fluid when said fluid is present, and with said switch means controlled by a first phase of said voltage source; diode means connected as part of said impedance means in a polarity opposite to said unidirectional switch means to conduct current from said voltage source on an alternate phase from said first voltage phase; amplifier means having input means connected to a portion of said impedance means with said amplifier means being responsive to the charge and discharge of said capacitor means through said conductive fluid; and said amplifier means having output means with said amplifier output means being responsive to the presence of said fluid at said probe.

2. A power supply and control as described in claim 1 wherein said capacitor means is a capacitor; and said charge and said discharge of said capacitor contains substantially the same electrical energy but having dissimilar voltage characteristics.

3. A power supply and control as described in claim 2 wherein said switch means is a silicon controlled rectifier having a gate connected to control said silicon controlled rectifier; and said diode means is a diode.

4. A power supply and control as described in claim 3 wherein said conductive fluid is water contained in boiler means and wherein said probe with said power supply and control are adapted to operate said water filled boiler means.

5. A power supply and control as described in claim 4 wherein said amplifier output means contains a relay having contacts connected to control said water filled boiler means.

6. A power supply and control as described in claim 5 wherein said source of voltage having alternating voltage phases is derived from a normal line voltage source.

7. A power supply and control as described in claim 6 wherein said gate of said silicon controlled rectifier is connected to said voltage source by means of a voltage divider including a voltage breakdown means to control the operation of said silicon controlled rectifier to discharge said capacitor.

8. A power supply and control as described in claim 7 wherein said amplifier input means includes a resistor connected across said probe element to said probe guard ring.

* * * * *